United States Patent
Maida-Smith et al.

(10) Patent No.: US 9,667,654 B2
(45) Date of Patent: *May 30, 2017

(54) POLICY DIRECTED SECURITY-CENTRIC MODEL DRIVEN ARCHITECTURE TO SECURE CLIENT AND CLOUD HOSTED WEB SERVICE ENABLED PROCESSES

(71) Applicant: METASECURE CORPORATION, Houston, TX (US)

(72) Inventors: Kathy J. Maida-Smith, Houston, TX (US); Steven W. Engle, Garland, TX (US); Michael J. Nieves, Seabrook, TX (US)

(73) Assignee: METASECURE CORPORATION, Houston, TX (US)

(*) Notice: Subject to any disclaimer, the term of this patent is extended or adjusted under 35 U.S.C. 154(b) by 92 days.

This patent is subject to a terminal disclaimer.

(21) Appl. No.: 14/592,154

(22) Filed: Jan. 8, 2015

(65) Prior Publication Data

US 2015/0128214 A1    May 7, 2015

Related U.S. Application Data

(63) Continuation of application No. 12/778,750, filed on May 12, 2010, now Pat. No. 9,037,711.

(60) Provisional application No. 61/295,517, filed on Jan. 15, 2010, provisional application No. 61/265,821, filed on Dec. 2, 2009.

(51) Int. Cl.
| | |
|---|---|
| *G06F 15/16* | (2006.01) |
| *H04L 29/06* | (2006.01) |
| *G06F 21/62* | (2013.01) |
| *H04L 29/08* | (2006.01) |

(52) U.S. Cl.
CPC .......... *H04L 63/20* (2013.01); *G06F 21/6209* (2013.01); *H04L 63/168* (2013.01); *H04L 67/16* (2013.01); *H04L 63/0281* (2013.01); *H04L 67/306* (2013.01)

(58) Field of Classification Search
CPC .............................. G06F 21/6209; H04L 63/20
See application file for complete search history.

(56) References Cited

U.S. PATENT DOCUMENTS

| | | |
|---|---|---|
| 7,647,627 B2 | 1/2010 | Maida-Smith et al. |
| 2004/0128546 A1 | 7/2004 | Blakley, III et al. |
| 2005/0264581 A1 | 12/2005 | Patrick et al. |
| 2005/0267892 A1 | 12/2005 | Patrick et al. |
| 2005/0267947 A1 | 12/2005 | Patrick et al. |
| 2005/0270970 A1 | 12/2005 | Patrick et al. |
| 2005/0273497 A1 | 12/2005 | Patrick et al. |
| 2005/0273502 A1 | 12/2005 | Patrick et al. |
| 2005/0273516 A1 | 12/2005 | Patrick et al. |

(Continued)

OTHER PUBLICATIONS

Metasecure Corporation, "Extended European Search Report," dated Mar. 31, 2015, EPO App. No. 12742209.5, 7 p.

*Primary Examiner* — June Sison
(74) *Attorney, Agent, or Firm* — Conley Rose, P.C.

(57) ABSTRACT

A policy directed, security-centric model driven architecture is described to secure internal web services, such as those implementing service-oriented architecture (SOA), and external web services such as those hosted on a cloud computing platform. A distributed data dictionary hosted across multiple dictionary engines and operating in conjunction with web security services are used to embed security profiles in web services messages and to validate messages that contain such security profiles.

7 Claims, 11 Drawing Sheets

(56) References Cited

U.S. PATENT DOCUMENTS

| | | |
|---|---|---|
| 2005/0273517 A1 | 12/2005 | Patrick et al. |
| 2005/0273518 A1 | 12/2005 | Patrick et al. |
| 2005/0273520 A1 | 12/2005 | Patrick et al. |
| 2005/0273521 A1 | 12/2005 | Patrick et al. |
| 2005/0273847 A1 | 12/2005 | Patrick et al. |
| 2005/0278335 A1 | 12/2005 | Patrick et al. |
| 2005/0278374 A1 | 12/2005 | Patrick et al. |
| 2006/0005063 A1 | 1/2006 | Patrick et al. |
| 2006/0007918 A1 | 1/2006 | Patrick et al. |
| 2006/0021017 A1 | 1/2006 | Hinton et al. |
| 2006/0031353 A1 | 2/2006 | Patrick et al. |
| 2006/0031354 A1 | 2/2006 | Patrick et al. |
| 2006/0031355 A1 | 2/2006 | Patrick et al. |
| 2006/0031431 A1 | 2/2006 | Patrick et al. |
| 2006/0031432 A1 | 2/2006 | Patrick et al. |
| 2006/0031433 A1 | 2/2006 | Patrick et al. |
| 2006/0031481 A1 | 2/2006 | Patrick et al. |
| 2006/0031930 A1 | 2/2006 | Patrick et al. |
| 2006/0034237 A1 | 2/2006 | Patrick et al. |
| 2006/0069791 A1 | 3/2006 | Patrick et al. |
| 2006/0080419 A1 | 4/2006 | Patrick et al. |
| 2006/0129558 A1 | 6/2006 | Brown et al. |
| 2006/0136555 A1 | 6/2006 | Patrick et al. |
| 2006/0143179 A1 | 6/2006 | Draluk et al. |
| 2007/0050376 A1 | 3/2007 | Maida-Smith et al. |
| 2007/0124797 A1 | 5/2007 | Gupta et al. |
| 2007/0136578 A1 | 6/2007 | Dubhashi et al. |
| 2007/0294743 A1 | 12/2007 | Kaler et al. |
| 2008/0022358 A1 | 1/2008 | Agarwal et al. |
| 2009/0187964 A1 | 7/2009 | Kao et al. |
| 2009/0240728 A1 | 9/2009 | Shukla et al. |
| 2009/0241104 A1 | 9/2009 | Amiga et al. |
| 2009/0248737 A1 | 10/2009 | Shukla et al. |
| 2009/0249451 A1 | 10/2009 | Su et al. |
| 2010/0306834 A1 | 12/2010 | Grandison et al. |
| 2011/0004922 A1 | 1/2011 | Bono et al. |
| 2011/0016477 A1 | 1/2011 | Schechter et al. |
| 2011/0137935 A1 | 6/2011 | Bobick et al. |
| 2012/0136843 A1 | 5/2012 | Bone et al. |
| 2014/0052840 A1 | 2/2014 | Shukla |

POLICY DIRECTED SECURITY-CENTRIC MODEL DRIVEN ARCHITECTURE TO SECURE CLIENT AND CLOUD HOSTED WEB SERVICE ENABLED PROCESSES

CROSS-REFERENCE TO RELATED APPLICATIONS

This is a continuation application of U.S. patent application Ser. No. 12/778,750, filed May 12, 2010, titled "Policy Directed Security-Centric Model Driven Architecture To Secure Client And Cloud Hosted Web Service Enabled Processes," which claims priority to U.S. provisional patent application Ser. No. 61/265,821, filed Dec. 2, 2009, titled "Secure Cloud Computing," and U.S. provisional patent application Ser. No. 61/295,517, filed Jan. 15, 2010, titled "Pushing Security Profile Into the Clouds," each of which is incorporated by reference in its entirety.

BACKGROUND

There is a trend toward "cloud computing" in which a client's services are hosted by a third party's network of computers, storage devices, etc. Cloud computing reduces the capital expenditure requirements by the client to buy computers, routers, storage devices, and the like. Instead, the client relies on the third party's hardware and software infrastructure. One of the issues, however, that should be addressed is security as the client does not own and control the hardware and software on which its services and data are hosted. Aside from cloud computing environments, security of even client-controlled networks and the data and services hosted thereon is an issue. In both cases security in driven by policy, specifically security policy, the scope of which is based on two fundamental tenants. The first tenant is that security policy is only relevant to the extent reached by the IT infrastructure that implements the policy; security policy cannot be applied beyond the means to control it. The second tenant, the degree of implementation fidelity, is determined by technology capability and the amount of acceptable risk determined by management. These two basic tenants respectively reflect the constraints that exist in collaboration across the enterprise, with vendors and clients, and the cost vs. risk balance of security technology deployment and maintenance. Unfortunately the security model that exists today, one that industry and the enterprise is familiar with, is significantly compromised; the changing landscape of information technologies, IT infrastructure topologies, and business needs have made it so.

BRIEF DESCRIPTION OF THE DRAWINGS

For a detailed description of exemplary embodiments of the disclosure, reference will now be made to the accompanying drawings in which.

NOTATION AND NOMENCLATURE

Figure 1:
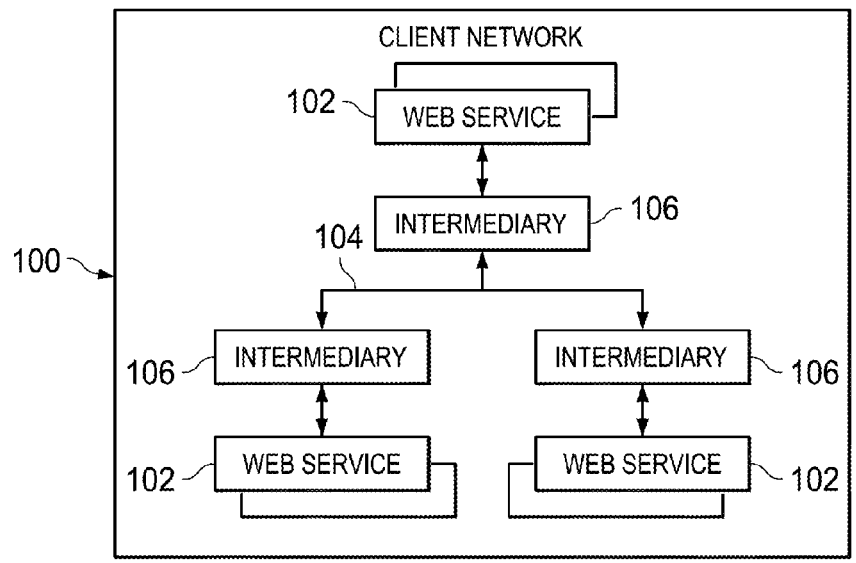
FIG. 1 shows an embodiment of a system in which the client owns the network on which the web services are hosted and in which intermediaries are used for security.

Certain terms are used in the following description and claims to refer to particular system components. As one skilled in the art will appreciate, computer or software companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

The term "client" refers to the person or organization that owns and uses the web services to run the client's organization. A client may be any form of organization such as company, loosely formed organization, or an individual.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Introduction.

Various embodiments described herein are related to "Web Services" and security improvements thereof for securing cloud and/or service-oriented architecture (SOA). The following provides an overview of web service concepts.

Web Service Concepts.

Web services are typically application programming interfaces (API) or web APIs that can be accessed over a network, such as the Internet, and executed on a remote system hosting the requested services. In common usage the term refers to clients and servers that communicate over the Hypertext Transfer Protocol (HTTP) protocol used on the web. Such services tend to fall into one of two camps: SOAP and RESTful Web Services. SOAP based Web Services use Extensible Markup Language (XML) messages that follow the Simple Object Access Protocol (SOAP) standard and have been popular with traditional enterprise. In such systems, there is often a machine-readable description of the operations offered by the service written in the Web Services Description Language (WSDL). More recently, REpresentational State Transfer (REST) (RESTful web services are those conforming to the REST constraints) the REST web services have been regaining popularity, particularly with Internet companies. By using the PUT, GET and DELETE HTTP methods, alongside POST, these are often better integrated with HTTP and web browsers than SOAP-based services. They do not require XML messages or WSDL service-API definitions.

Each web service further implements a public interface described in Web Services Description Language ("WSDL"). The interface is an XML-based service description on how to communicate using the given web service.

Web service information is published using a standard protocol referred to as Universal Description, Discovery Integration ("UDDI"). The UDDI enables applications to automatically discover, and/or look up web services information in order to determine whether to access and invoke them, analogous to the manner in which a Yellow Pages phone book enables users to discover business services and how to access them. The UDDI registry indicates, for each service on the network, 1) the identity of the service, the Uniform Resource Locator ("URL") of the service, and what the service does.

Discussion of Alternatives in Web Services Environment Security.

In various alternatives, security components are implemented using Secure Sockets Layer ("SSL"), Public Key Infrastructure ("PKI"), and firewalls for electronic commerce systems operating over Hyper Text Transfer Protocol ("HTTP"). SSL is a technology that allows the systems that host client web services and servicing web services to communicate over a secure connection. SSL addresses authentication in that the serving host system presents the client host system with a set of credentials in the form of a server certificate, which is used to verify that the server is what it claims to be. SSL also addresses confidentiality in that the SSL link is encrypted so that third parties cannot decipher the data as it passes between the client and serving services on a network. Finally, SSL addresses integrity of data—SSL guarantees that the passed data is not modified.

A serving service may be provided indirectly to a client service. In an SSL secured environment, a client service accesses a serving service, and that serving service, now acting as a client service, then invokes remote serving services. Many services might be deployed in such fashion. In this environment, there are two security contexts: between the original client service and the original servicing service and between the original client service and the remote serving service.

The second security context (i.e., between the client service and the remote serving service) may be referred to as persistent security. The second security context controls the security of the end-to-end request/reply message (between the original client service and the remote serving service) to ensure security over more than one client to server connection. In other words, there is a need for persistent message security for messages, for which SSL is inadequate. While SSL encrypts the data stream, it doesn't support end-to-end confidentiality; it leaves the data exposed between the client service and the remote serving service.

Furthermore, SSL has several limitations when it comes to handling services. SSL provides point-to-point security between end-point hosting systems, not the services hosted on them. For securing processes consisting of multiple nested interacting services, service-to-service security, at the messaging level, is necessary because multiple intermediate hosting systems and services will exist between the two end-points services. In a SOAP based web services environment, there will be multiple messaging bases business processes operating across multiple hosting systems and their services, and using only SSL, it is extremely difficult to assess and control security operations in an integrated fashion. Furthermore, SSL does not support non-repudiation. Using SSL, a communicating partner cannot prove that another party has performed a particular transaction. In other words, SSL doesn't support an end-to-end audit trail from service request to service response. Finally, SSL does not support element-wise signing and encryption. Given a large XML order document, it may be desirable to only sign or encrypt part of the information, such as, for example, the credit card info. Encryption of only a portion of a message is difficult in SSL, because SSL is a transport-level security scheme as opposed to a message-level scheme.

Overall.

The present disclosure enables security to be embedded in every component of the basic web services messaging concept described above. Each web service defined has a security profile to establish how the service is regulated. Each defined user entity has an associated security profile identifying roles, responsibilities, and privileges. Additionally, each datum (message payload) is assigned a security profile identifying scope, ownerships, and allowed/disallowed actions. By implementing these three variations on the security profile and embedding them in a security profile that conveys what combinations/actions/services are allowed, web service interoperability is achieved that is secure beyond what has been achievable using the alternatives noted above.

The web services security embodiments described herein can be applied in a network in which the client (the entity that owns and operates a business process application) that owns the underlying web services also owns and operates the hardware and software infrastructure. In other embodiments, web services security is extended into the cloud computing environment in which at least some, and perhaps all, of the client's data and web services are stored on and hosted by a third party. The third party provides the hardware and software infrastructure necessary to host the client's services. Both contexts are described herein. In both cases the client's security policy for the auditing and control of the business process application must be applied to the messaging (data), services, and user entities which make up the business process application, which in the case of cloud computing means enforcing policy in a hosting environment in which the client may not control. Standard infrastructure level security mechanisms, such as SSL, cannot be client security policy directed.

Embodiment in which Client Owns Network.

Referring now to FIG. 1, a block diagram is shown illustrating a network 100 in which the client controls, owns, and/or operates the hardware and software running thereon. One or more web services 102 are shown coupled together via a network infrastructure, such as a service bus 104. One web service 102 may request access and use of another web service 102. In accordance with at least some embodiments, the web services generate and exchange SOAP (web service) messages with other web services.

The security described herein may be implemented by the various intermediaries 106 shown in FIG. 1. Each intermediary 106 is associated with one or more web services 102. In general, a web service 102 may exchange messages with another web service 102. The messages, however, are intercepted by the corresponding intermediaries 106. The intermediary queries its attached data dictionary engine instance for a reference model security profile that aligns with the message, user entity, and destination web service. If found, the intermediary 106 embeds the located security profile in the message and sends the message to the destination web service. The intermediary 106 associated with the destination web service intercepts the incoming message and compares the embedded security profile (from the reference model) to that of the security profile resident in the servicing intermediary's security model located in its attached data dictionary engine instance. If a match is found (user, data, service profiles), then the message, stripped of its security profile, is forwarded to the destination web service.

The intermediaries 106 may be implemented, for example, as software running on a computer and generally work in a background mode. The web services 102 generally are unaware of the existence of the intermediaries 106 when sending and receiving messages. That is, the web services 102 exchange messages without knowledge that the intermediaries are intercepting and processing the messages for security reasons. That the client owns and operates network (hardware and enabling software systems) 100 makes it possible for the client to install the intermediaries 106 on its own network.

Embodiment in which at least some of Client's Business Services are Hosted in a Cloud Computing Environment.

Figure 2:
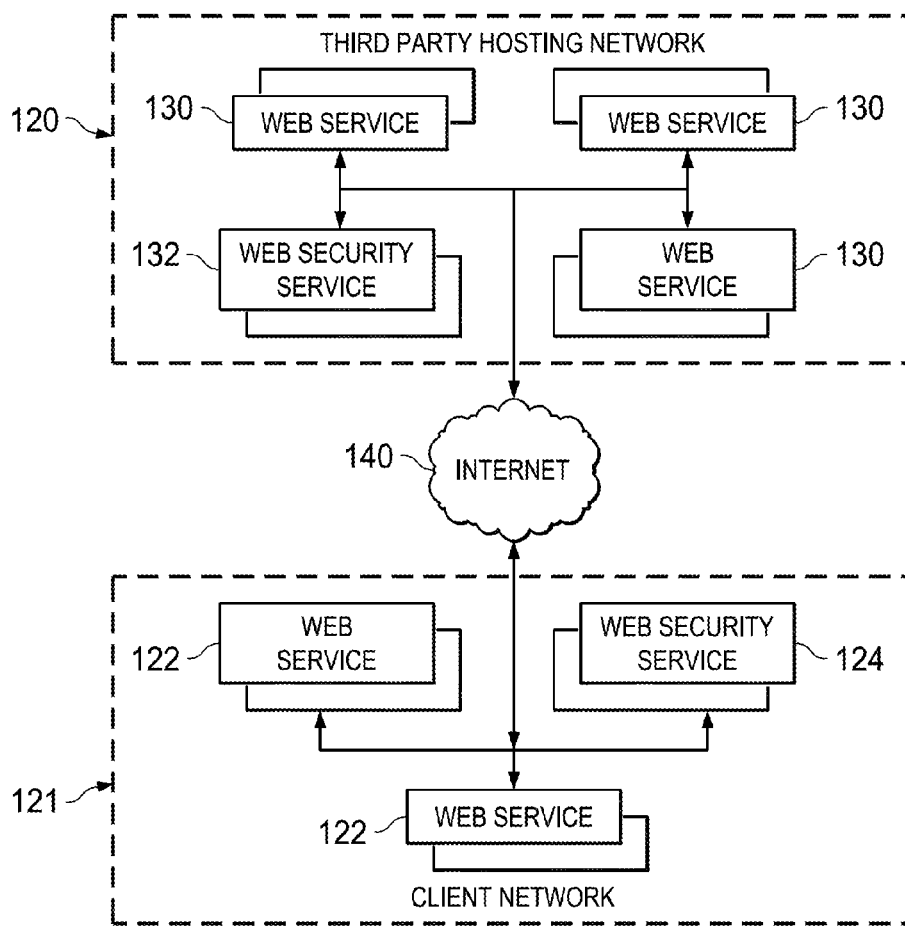
FIG. 2 shows an embodiment of a system in which at least some of the client's web services are hosted on a third party's network.

FIG. 2 illustrates an embodiment in which at least some of the client's web services are hosted on a third party's network 120. The client's network is designated as client network 121. The client network 121 interacts with the third party hosting network 120 via the internet 140 or other suitable type of network connectivity. The example of FIG. 2 shows that the client network 121 includes one or more web services 122 that are stored and executed on computers owned and operated by the client. Further, the third party hosting network 120 includes one or more web services 132 that belong to the client but that are stored on and hosted by the third party hosting network 120 and its hardware and software infrastructure.

Because the client has some of its services 132 executing on the third party's network 121, the client may be unable to have intermediaries loaded on to the third party network's computers as the client may not be permitted by the third party, or may not desire, to reconfigure the third party network's computers internal software to enable installation and operation of intermediaries. However, if the third party hosting environment provides no application framework and only provides hardware and generalized database managements systems then the client may be capable of hosting an intermediary consistent with the client's environment. Thus In the case where an application framework provided by the third party hosting environment must be used, a different paradigm is implemented to provide a similar security benefit to that of the intermediaries 106 noted above. Instead of using intermediaries that intercept messages and process such messages for security profiles, the embodiment of FIG. 2 uses web security services 124 and 132. Web security services 124 execute on the client network 121 computers, while web security services 132 execute, similar to web services 130, on the third party hosting network 120. While the web services 102 of FIG. 1 exchange messages and do not themselves implement security profiles (instead, the intermediaries 106 implement the security profiles), the web services 130 on the third party hosting network 120 of FIG. 2 specifically invoke the web security services 132. One or more of the web services 122 hosted on the client's own network 121 may also invoke corresponding web security services 124. The web security services 124 and 132 perform much the same functionality as the intermediaries 106 of FIG. 1, but are invoked by the web services themselves.

Hardware Implementation.

Figure 3:
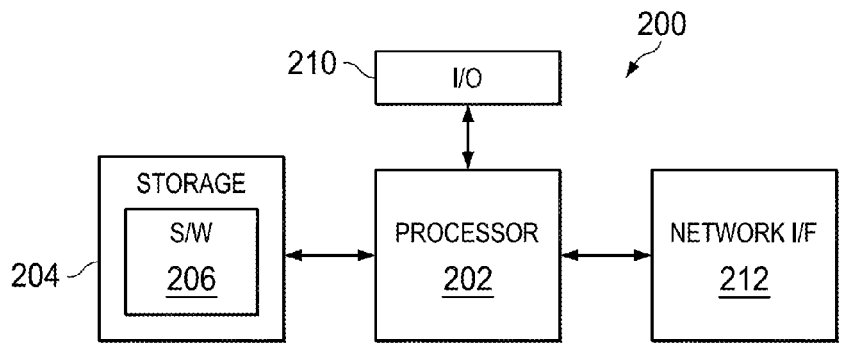
FIG. 3 shows a block diagram of an illustrative computer on which any of the services described herein can be stored and run.

Each of the various web services 102, 122, and 130, intermediaries 106, and web security services 124 and 132 of FIGS. 1 and 2 may be implemented on a server or on any general-purpose computer. FIG. 3 illustrates a computer system 200 suitable for implementing one or more the web services, intermediaries, and web security services disclosed herein. The computer system 200 includes one or more processors 202 that are in communication one or more computer-readable storage devices 204. Computer-readable storage device 204 may include volatile memory such as random access memory (RAM), as well as non-volatile storage such as read-only memory (ROM), hard disk drive, flash storage, etc. The computer system 200 may also include an input/output (I/O) device (e.g., display, keyboard, mouse, etc.) and a network interface 212. The storage 204 contains software 206 which is executed by processor 202. By executing the software 206, the processor is able to perform some or all of the functionality described herein as attributed to the web services 102, 122, and 130, intermediaries 106, and web security services 124 and 132. The various web services 102, 122, and 130, intermediaries 106, and web security services 124 and 132 may be implemented in software that runs multiple such computers. Some such computers may comprise servers and may not have a directly-connected I/O device. In accordance with at least some embodiments, the software and processes described herein are executed on a computer network comprising one or more computers. For example, the data dictionary engines and metadata repositories described herein execute on such a computer network.

The Intermediaries.

For the embodiment of FIG. 1, each intermediary 106 interfaces corresponding web services 102 to the service bus 104 which operates on the client network 100. Each intermediary 106 may be implemented in software that incorporates a data dictionary engine for the storage and retrieval of security profiles within its visibility as defined by architecture of the encompassing business process and the architecture of modeled security policy. Each intermediary 106 is a "touch point" into the executing business process (orchestration of web services) enabling dynamic visibility into data as it moves between web services—what the data is, who (e.g., which user entity) is utilizing the data, what version of the data is in circulation, which web service is permitted to access and use the data, and where the data has been and is going. This information is framed within a security-centric model driven architecture that is instantiated by object class information stored throughout the distributed data dictionary, a piece of which is resident within the data dictionary engine of any particular intermediary 106.

In various embodiments, each intermediary 106 injects a security profile into each SOAP message 104 that travels between web services. As SOAP messages translate the service bus 104 to other web services, the intermediary associated with each destination web service examines the message for the security profile to determine whether the message is valid within the context of user entity, message, and service. Each intermediary is operable to communicate with each other intermediary in a fashion that is transparent to the web services and/or users of the web services.

The security of the client's web service enabled process may be managed according to defined "states" by identifying and tracking (through the intermediaries 106) each and every activity executed across the processes service bus 104. Each activity involving messaging across the service bus is assigned a security profile; each security profile is assigned a unique Globally Unique Identifier (GUID). The activities add to a security profile, and the security profile itself, including the creation, identification, transportation, and processing of data are security artifact objects. Each object has a unique tag, and the tag is unique based on a multi-part structure that provides for a unique identifier administered by a registration process that occurs in the intermediary 106. In addition, because an object belongs to a class and any given class may have many instances, in the intermediary 106 the instances are given unique version identifiers used to identify the version. In this fashion, the multi-part structure also stores the version number that, in conjunction with the class identifier, provides for a unique global object instance identifier. The multi-structure identifier also has a geopolitical identifier that is an additional unique structure for the purpose of identifying an organization that may have political boundaries as defined by the user. The geopolitical identifier thus conveys the concept of ownership. The geopolitical identifier may be used for export control compliance and other political conditions necessitating retention of specific control designation at the identifier level.

The management of these security profiles is accomplished with the use of a data dictionary engine instance associated each intermediary 106. All metadata maintained by the data dictionary engine as well as instance data identified by Globally Unique Identifier tags are driven by the object-oriented architecture and implemented using a data dictionary engine.

The data dictionary engine is a database-embedded engine that contains a data dictionary for metadata; it has as a set of components and services that are designed to define, identify, manage, expose, and archive security objects. Objects in the engine have an intrinsic representation based on entities and relationships between entity types. These entities form a database design containing: Object Class, Data Class, Action Class, Behavior Class, Relationship Class, Object Instance, and Data Instance. Each class is supported by a class tree with inheritance, refinement, and sub-classing rules established and refined by an expert user (Data Architect). Data Instance and Object Instance are instantiations of classes and represent the embodiment of the real world as framed by the class imposed architecture.

A class tree defined by the database design represents business processes supporting a security profile and business data containing security information. When these business processes and data definitions change, the changes are then captured by modifications to the class tree in the intermediary 106.

The data dictionary engine of the intermediary 106 provides the functionality to establish, preserve, and evolve the definition of all class trees and instances. It is used to drive and support the functionality of a metadata repository, such that one instance of a metadata repository (i.e., within a single intermediary) is operable to elaborate a security policy and project a security policy of an enterprise onto a security profile embedded in data messages and services. Each instance of a data dictionary engine can communicate with another data dictionary engine (i.e., between instances of the intermediaries) for the purpose of exchanging information and functionality as defined by the class architecture. The class architecture is thus the method of defining what the data dictionary engine will operate on, and with, to achieve business security objectives that are orchestrated by an administrative function. Within the enterprise, an administrative function performs the task of configuring the class tree, and thus the data dictionary engine behavior's. The end behavior is what is sought because the engine will execute whatever object class methods are available and consistent with the objects involved in the service request.

Figure 4:
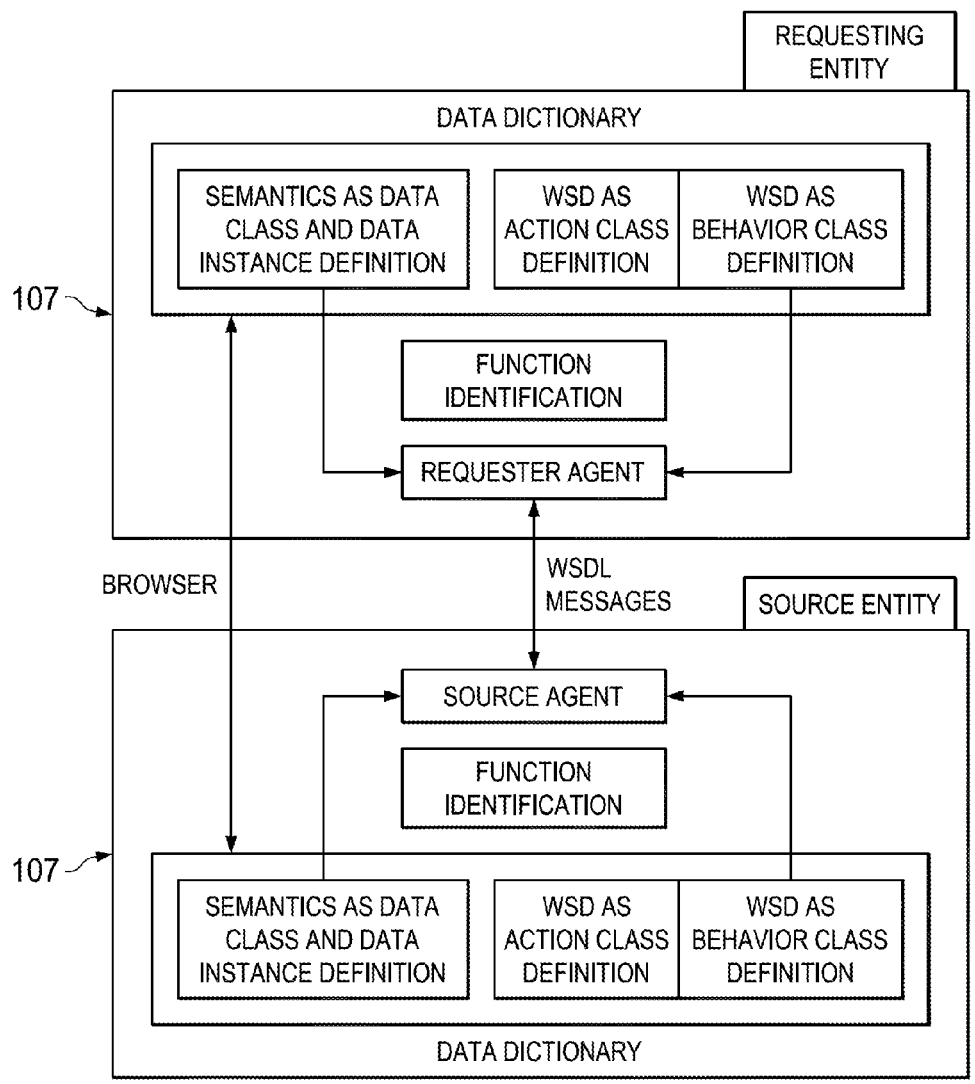
FIG. 4 illustrates a block diagram of two data dictionary engines interacting between two intermediaries of FIG. 1, or two web security services of FIG. 2, or one intermediary of FIG. 1 and one security service of FIG. 2.

As illustrated in the diagram of FIG. 4, the data dictionary engine 107 of each intermediary 106 establishes a platform for the definition and collection of business models and security profiles that, in turn, establish the domain (area of emphasis) for class tree elaborations. The security domain is thus established as part of the class tree configurations. The data dictionary engine of the intermediary processes object and class information, providing the ability to identify, collect and manage specific security information throughout an "end-to-end" security model.

Each security profile embedded by the intermediary 106 is a managed object instance, belonging to a parent class that is in the business security class tree consistent with enterprise level security profiles.

The security profiles embedded at the data-level maintain a security profile with a corresponding security profile designator. The security profile includes at least three types of information assignments: the data security profile, the user security profile, and the service security profile. The security profile comprises a set of encoded permissions, privileges, and selected quality hierarchy according to the three types of information.

The Data Security Designation may consist of one of the following designations: Source-of-record ("SOR"), clone ("C"), persistent ("P"), and temporal ("T"). The Services Security Designation may consist of one of the following designations: generate ("G"), destroy ("D"), consume ("C"), provide ("P"), request ("R"), own ("O"), and archive ("A"). The User Security Designation may consist of one of the following designations: own ("O"), read ("R"), write ("W"), delete ("D"), proxy-for ("PF"), proxy-to ("PT"), execute ("E"), keep ("K"), subclass ("S"), and archive ("A"). Each designation may be selected by the owner of data upon making it available on the network 100.

Activity associated with each and every profile may be tracked (by the intermediaries) throughout the life cycle of process and data, thereby accomplishing management at the system level. This management of a security profile at the system level is defined by the articulation of a security policy. The articulation of a policy may be accomplished by class tree elaboration, bringing the existence of policy profiles into relationship with IT infrastructure artifacts and data resource artifacts.

Each class instance includes details about ownership, permissions and authority for interaction with other class instances. At each interaction, security profile verification is conducted for compatibility (i.e., a comparison is performed between security profiles), thus allowing the interaction to complete as defined. If the interaction is not supported because of security profile violations, then the interaction is tracked, logged and processed according to the violation class.

Each message containing a security profile is composed of at least two artifacts: the data artifact containing the XML elements, attributes, and associated XML articulations constituting a valid XML document, and the security profile artifact also articulated as a valid XML document. The security artifact also contains the artifact identifier and other naming and version control components that identify the artifact as it exists at the enterprise level.

Various Policy Benefits.

To meet the numerous legal, statutory, and regulatory requirements for data privacy, corporate governance reform, and like initiatives, an understanding of the actual messaging data beyond security policy and requirements may be helpful. This understanding comes in the form of information on the as-designed data flows of each process executing in the environment, and information derived from the architecture and design of each process. With this information incorporated into the data dictionary engine of the intermediary in the form of process, service, and message objects and classes, and thus incorporated into the security profile objects and classes, the security controls can perform messaging protection, control, and auditing functions within the context of the expected messaging behavior amongst services, instead of merely basing actions on the contents of message payload and header, blind to the context in which this message is being transacted.

Security Policy Representation.

Figure 5A:
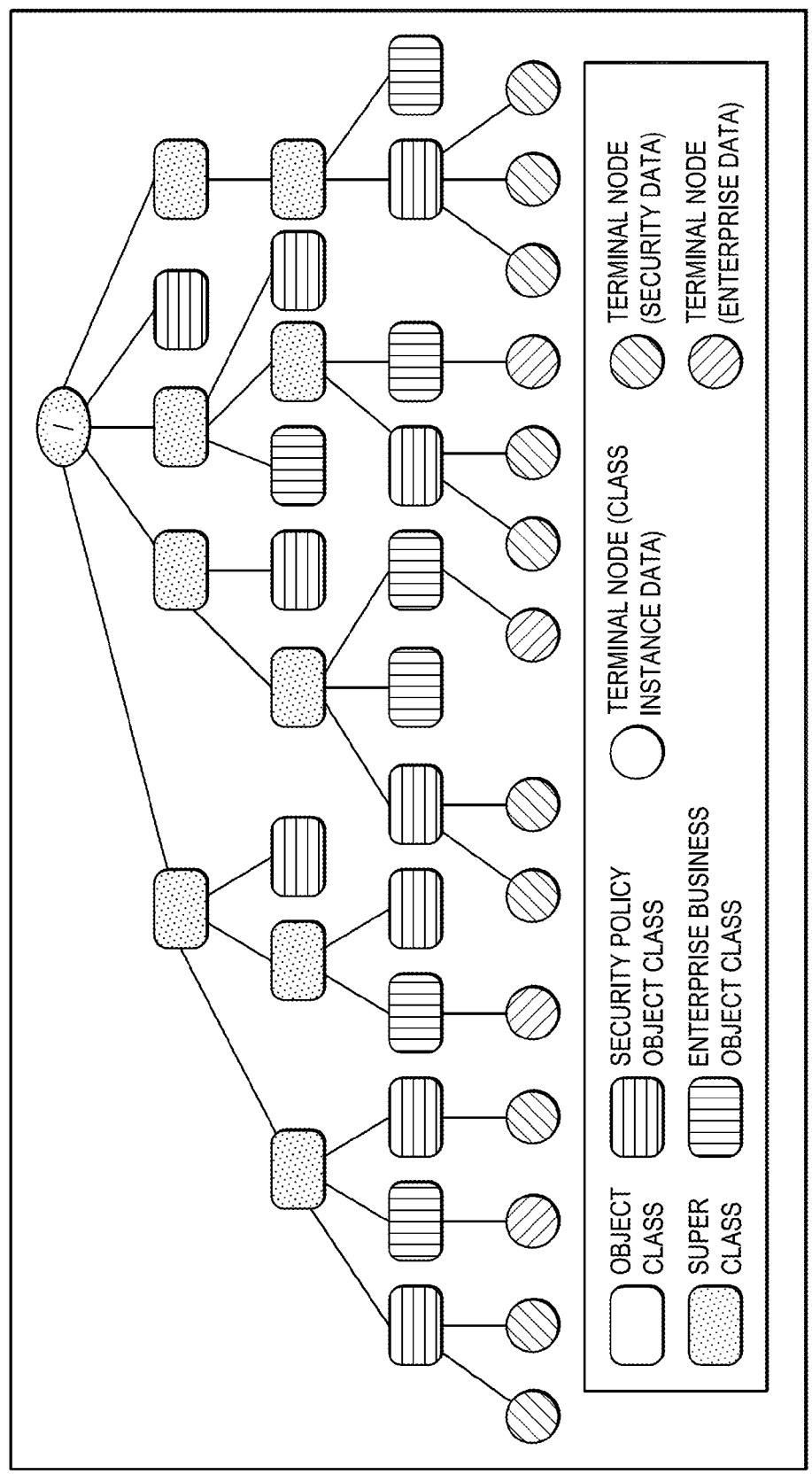
FIG. 5a depicts a hierarchical class tree consisting of an aggregation of multiple multi-domain classes to create super classes, classes that contain security policy classes, business classes, and security profiles.

A security policy is represented as a tree hierarchy structure of security model objects each containing security profiles as defined in U.S. Pat. No. 7,647,627. These security model objects are derived from security policy classes and contain security profiles; they are designed to represent security policy constructs. They form piece-parts of the larger class tree hierarchy. The content of a class tree hierarchy crosses multiple domains as it contains and elaborates upon security policy object classes and enterprise business object classes. An enterprise business object class is defined as an object class that describes the data and interoperations of the automated business process. Business objects captured as part of the business process modeling metaphor is a good example of an enterprise business object class. The aggregation of multiple multi-domain classes creates super classes, classes that contain security policy classes, business classes, and security profiles. See FIG. 5a. The hierarchy of the total class tree represents a total architecture with a coarseness gradient beginning at the top and traversing towards the bottom; security policy fidelity increases as does the aggregated enterprise metadata. Each tree branch manifests an increasing fidelity until one or more terminal nodes are found where the security data is held, and in the case of a super class, where enterprise data is also held; this is the class instance data. Security profile data is held with the business data at the terminal nodes and reflects a security evaluation of the business data based on associated security policy application. This evaluation is given a security structure which is the security profile defined in U.S. Pat. No. 7,647,627, incorporated herein by reference.

The Hierarchical Class Tree.

The basic topology of a hierarchical class tree is defined as having three partitions.
(1) The absolute "root" node from which all hierarchical class tree branches emanate,
(2) the system-based security policy level containing system-based security policy object classes in addition to enterprise business object classes, and
(3) the client-based security policy level containing client-based security policy object classes, security policy object instances (terminal nodes), enterprise business object classes, and enterprise business object instances (terminal nodes).

Figure 5B:
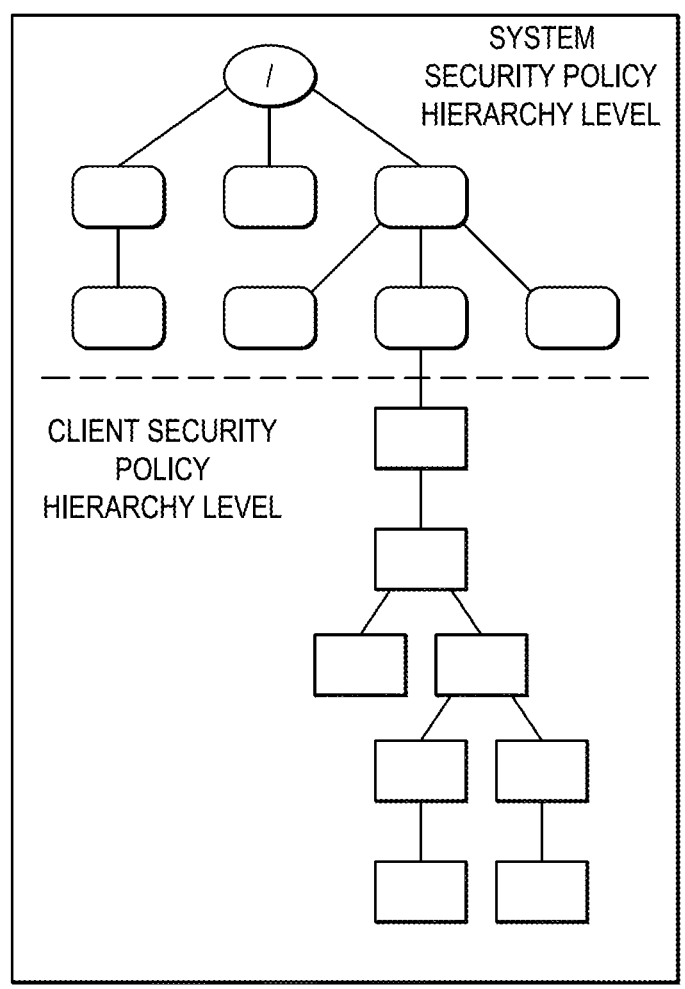
FIG. 5b shows a hierarchical class tree consisting of three partitioned levels, the absolute "root" node, the system-based security policy level, and the client-based security policy level.

This basic topology is represented in FIG. 5b and managed within the data dictionary engine as defined in U.S. Pat. No. 7,647,627.

The system-based security policy level and the client-based security policy level together represent an enterprise-wide security policy topology, potentially spanning many web service enabled processes. They may or may not be administered by the same organization. In either case, a client-based security policy level may itself be sub-partitioned, each sub-partition representing a business unit and division with its own local administration. The case where the system-based security policy level and client-based security policy level are not administered by the same organization may represent where the system-based security policy level is owned and administered by a cloud hosting service provider and the client-based security policy level is administered by the cloud client.

Each participating client within the cloud then orchestrates or pushes their respective security policy onto the cloud by submitting their client-level security policy sub-tree, where it is attached to the hosting service provider's system-based security policy level tree. Ownership rights constrain what information is pushed to a cloud such that only branches containing terminal nodes of the client-level security policy level hierarchy owned by the client performing the push is accepted at the cloud hosting service provider.

In FIG. 5b the hashed horizontal line is a representation of a partition between the system-based security policy level and client-based security policy level. Where this demarcation is placed is dependent on how much hierarchy is provided by the owner of the System Security Policy; an increase in fidelity is represented by longer branches on the tree (i.e., the demarcation is low in the tree hierarchy).

Where there is robust system-based security policy level definition, more opportunity for integration exists with a Client Security Policy because parent class availability for adoption leads to client-based refinement, where allowed (i.e., there is more Security Policy Tree for the client to connect too, and refine from). The concept of adoption is where a parent class or relationship class can be used to gain established definition and methods for security policy at the client-based security policy level. The concept of flexibility is manifested when adopting a parent class that allows for sub-classing definition by refinement and sub-classing rules enforcement, both of which are as defined in U.S. Pat. No. 7,647,627. In refinement, class inheritance may be deleted or configured so that the attributes can be altered, or maybe defined to prohibit any further refinement.

Looking at a typical environment involving a client enterprise site, henceforth referenced as client site, and the collaboration with a cloud hosting service provider site, henceforth referenced as the cloud site, certain topological characteristics are found. A client's site Client Security Policy may advance security policy much further than the host site System Security Policy provides; given the system security policy hierarchy tree is weak. This is reflected in a tree branch where the partition between the client-based security policy level and the system-based security policy level is high up in the security policy hierarchy, reflecting contributing security fidelity by the client into the cloud hosting service provider site security policy hierarchy. The condition creates delineation between the system security policy hierarchy level and the client security policy hierarchy level that is not horizontal across the width of the security policy hierarchy tree but rather it varies from branch to branch. It is also indicative of a potential condition where the client's adoption of the cloud site's established system security policy hierarchy is not fully integrated and used. This type of condition is transparent when using this methodology and therefore subject to interface agreement elaboration and conformance scrutiny. There are strategies for choosing a high fidelity vs. low fidelity system security policy hierarchy, with advantages and disadvantages; the key is finding the correct balance. When the system security policy is weak the condition is advantageous for system security policy site hosts because it leaves the responsibility for enterprise security policy and implementation largely to the client using the service—the client "owns" the security policy for the components of their application at that site. The system security policy site simple supports the need for some basic minimal security policy components, most likely associated with actual security mechanisms within the host site's infrastructure; producing a very shallow system security policy hierarchy. A shallow system security policy hierarchy is also advantageous to the client because exporting the client security policy hierarchy segments to the system security policy site is simplified from a parent to child class relationship; the more generic the parent the easier it is interfacing the client-side security policy. The client-based security policy is then unconstrained to control refinement of the client security policy partition.

The end of any particular system-based security policy level tree branch and the top, or start, of a client-based security policy level tree is represented by a node defined as a boundary node. A boundary node is an identity type node with a security profile structure; it is both the terminal node of a system-based security policy level tree branch and the absolute "root" node of the attached client-based security policy level tree. The importance here is that the client-based security policy level tree absolute root node is also the identity node for the client. This identity node contains information used to identify the client and the client's security policy to the cloud hosting service provider, or any other external supplier, that provides a system security policy hierarchical service via the data dictionary engine as explained here and in U.S. Pat. No. 7,647,627. It is beneficial to all that this identify mechanism (an interface) be made as flexible as possible by the cloud hosting service provider for all client participants.

The basic system architecture components that must be established such as communications protocols indirectly impact the System Security Policy and the Client Security Policy. When representing any communication protocol (such as IPv4 or IPv6), in a class tree hierarchy the components of the protocol are manifested as metadata objects in the distributed data dictionary. The data dictionary containing a metadata model of the protocol, notably at the transport layer of the model, are represented as a set of tree branches constructed for their respective security object class definitions and are entirely dependent on the fidelity chosen by the data architects. Therefore, during security architecture development, communications aspect of the IT infrastructure incorporating security components from the protocol may be modeled using a level of abstraction such that they only indirectly impact the system security policy hierarchy. For example, rather than have an implementations of WS-Security defined in the architecture hierarchy detailing the aspect used during communications, a model of the software platforms imposing security at a lower fidelity level of definition is represented; assuming that the software platforms use WS-Security as the underlying standard for security.

The semantic and syntactic aspect of system architecture is captured and managed in the class tree architecture hierarchy by using a data dictionary engine as exemplified and explained in U.S. Pat. No. 7,647,627.

A System Security Policy Site.

Figure 5C:
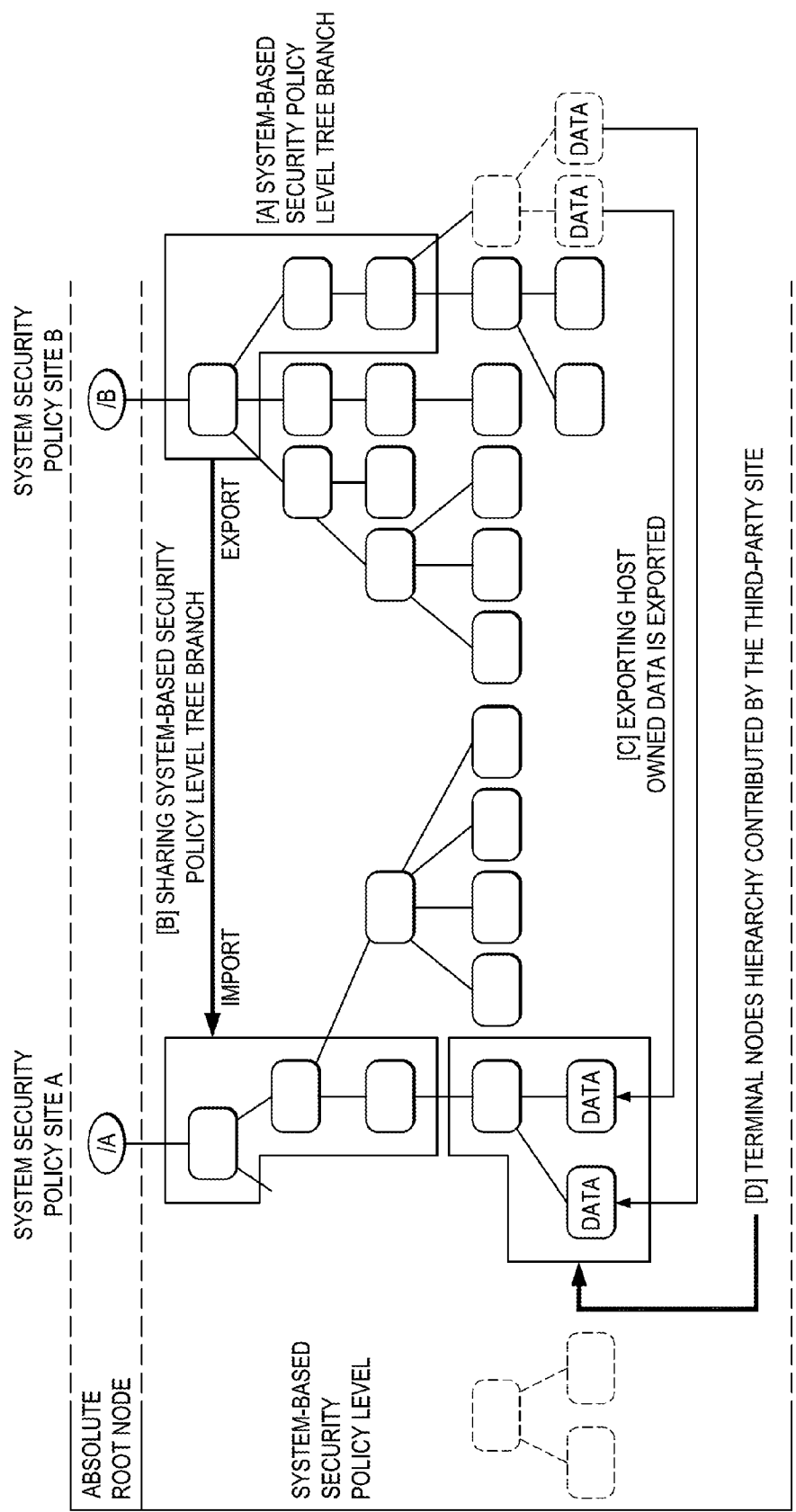
FIG. 5c shows two System Security Policy Sites each with a data dictionary engine instance, a system-based security policy level tree branch representing a system security policy hierarchy, the donation of a said branch from one data dictionary engine instance to another, the exporting of host owned data, and a third-party site contribution of tree branch hierarchy terminal nodes.

A System Security Policy Site can be any controlling authority providing a service to client Security Policy Sites such that a system-based security policy level tree branch, defined by the System Security Policy Site, is established from the absolute root node down to the client-based security policy level boundary node (see FIG. 5c[A]). This tree branch is immediately above the participating client security policy hierarchy, which as discussed earlier is topped, or started, by an identity node (also a boundary node). A System Security Policy Site can exchange such system-based security policy level tree branches with other System Security Policy Sites providing they are in whole; that is, intact from the absolute root node to the partition between the client-based security policy level and the system-based security policy level (excluding the client identity node) for a specific branch of the donor system security policy hierarchy. In other words, a client security policy hierarchy is the subset of super classes within a client-based security policy level that when traversed define the client component of the security model for a particular client web services enabled process. Equally, a system security policy hierarchy is the subset of super classes within a system-based security policy level that when traversed define the system component of the security model for a particular client web services enabled process. FIG. 5c[B] illustrates the donation of a system security policy hierarchy tree branch exported/imported from one data dictionary engine instance to another.

The exporting of a system-based security policy level tree branch from a donor system security policy hierarchy and subsequent importing to a requesting system security policy hierarchy host can include tree branches that did not belong to the donating host, those branches having come from a third-party. However, migration control of the third-party tree branches is maintained by the contributing third-party system security policy host—requests for export/import must be made directly and granted explicitly. The same condition exists when client-based security policy levels, as defined by client security policy architecture, are involved as a third-party; they levy publishing rights that are maintained by that third-party client's system security policy host. In both cases, a requesting host may see the third-party contribution to the tree branches requested from a host, but only the exporting host owned data is exported (FIG. 5c[C]). The third-party site contributes the actual third-party tree branch(es) hierarchy terminal nodes (FIG. 5c[D]). The identity of this third party is known to the cloud site only as the root node of the third party tree branch is a boundary node and an identity type node.

A system security policy hierarchy host may reside in a cloud as a service providing system security policy services exclusively as a security cloud. It may have other enterprise-wide business services integrated with the security policy as described earlier in the hierarchical class tree section.

A Client Security Policy Site.

A client site is a client operated/owned self-sustaining enterprise level entity with self-established tree hierarchy instances. Design of the enterprise hierarchy class tree and the definition of security policy classes and security policy objects is an exercise performed by client site architects. The hosted client class tree hierarchy has a designated absolute root node from which all tree branches emanate. The absolute root node has inherent properties (identity class) that allow for the connection of the node (and underlying class tree) to an existing system security policy hierarchy branch, as mentioned earlier. From this generic class a series of branches are defined that, if desired, will encompass the client's entire enterprise definition for process and data. This definition can take place in segments and is allowed to mature over time to represent increasing scope of the enterprise as the enterprise expands. Each class definition has built in a set of subclasses for security policy and security profile definition.

An enterprise is at all times represented as a self-defined and self-reliant security policy architecture hierarchy consisting of (1) an absolute root node (also referred to as an identity node), (2) a system security policy hierarchy, and (3) a set of client security policy hierarchies. When there is no security integration taking place between enterprises, sharing of tree branches occurs within the enterprise and tree branch ownership is assigned along organizational boundaries. One form of assignment is to grant ownership based on the source of the data, in other words, the source of record is the default owner. The source of the method is the owner and so on. Co-ownership is represented as an occurrence of adoption and refinement; where a branch is adopted and refined. The refinement is then a new instance and belongs to the refiner, yet the parent branch is still owned by the original source of record.

When an enterprise shares security policy with other enterprises, a system security policy hierarchy is developed by adopting the current system security policy hierarchy from each enterprise. This incorporation forms a new system security policy hierarchy tree instance, which allows for the integration of all participating client security policy hierarchies. The new policy hierarchy can be put in a cloud to enable a multi-enterprise cloud-based security policy hierarchy. When an enterprise pushes some segment of its system and client security policy hierarchy to a cloud, then all of the enterprise security policy hierarchy pushed to the cloud is considered client-based security policy level material.

System and Client security policy hierarchy is shared in order for data and services to flow between Data dictionary engine nodes. Data dictionary instance to data dictionary instance process flow represents site to site connectivity and provides for a controlled distribution of services and data per the migration control mechanisms described earlier. If an applicable message or transaction does not exist in the security policy hierarchy it cannot be sourced by a provider, travel on the bus, or be requested and processed by a consumer. The application-enabled component of a client's business process, no matter where it is hosted in the cloud, or outside the cloud, is described and orchestrated by the data dictionary model capturing the system and client security policy hierarchy. Security orchestration is defined by business processes models integrated with security; it is the first part of the data and process life-cycle and fundamental to all subsequent activity for the enterprise. Client security policy hierarchy segment visibility is shared between organizations at every level and across enterprise boundaries facilitated by the system security policy hierarchy site(s), but process and data distribution is only allowed based on the client security policy hierarchy and associated security profile assigned therein; a pre-established security profile between requestor and provider.

Embodiment in which all Client Web Services are hosted on a Network Controlled by the Client.

Figure 6:
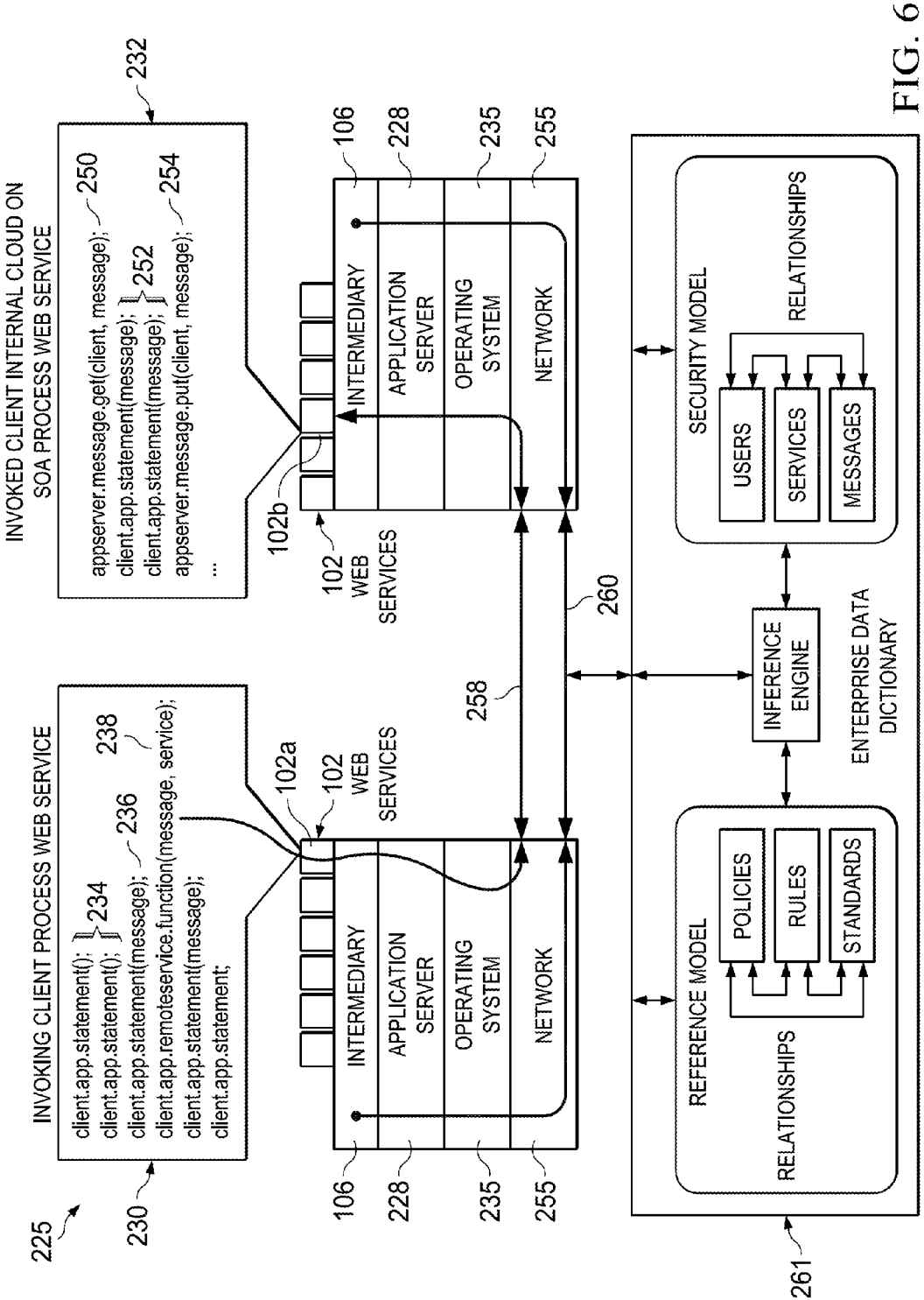
FIG. 6 illustrates the interaction of various software elements corresponding to the embodiment of FIG. 1 in which intermediaries are used.

FIG. 1, discussed above, illustrates an embodiment in which all of the client's web services are hosted on its own network 100. FIG. 6 illustrates a software view 225 corresponding to the embodiment of FIG. 1. Web services 102 are shown running on top of intermediaries 106. Intermediaries 106 run on top of an application server 228 which, in turn, runs on top of an operating system 235. A network 255 enables the software stack 106, 228, and 235 to exchange SOAP messages.

In the example of FIG. 6, one web service 102a sends a SOAP message to another web service 102b. Web service 102a thus is an invoking service which invokes web service 102b (the invoked service). A portion of the functions performed by the invoking service 102a is illustrated at 230, while a portion of the functions performed by the invoked service 102b is illustrates at 232. At 234, the invoking service 102a performs various functions and at 236 generates a SOAP message to be sent to invoked service 102b. At 238, the invoking service 102a specifies a message and a service to be invoked using the specified message. Arrow 258 illustrates that, from the point of view of the web services, invoking service 102a invokes services 102b and provides the specified SOAP message across the network 255 to the targeted invoked service 102b which then processes the message. At 250, the invoked service 102b retrieves the SOAP message and then processes the message at 252. At 254, the invoked service 102b sends back a reply message to the invoking service 102a.

FIG. 6 also shows the "enterprise data dictionary," an intermediary providing facilities for user control of the metamodel which contains the security policy model and defined above. This represents the "control Panel" for directing intermediary and security services behavior (via the distributed data dictionary), wherever they may be located.

Referring still FIG. 6, the intermediaries 106 intercept the web services' SOAP messages and process the messages from a security standpoint. Arrows 260 illustrate the interaction of the intermediaries 106 and intermediary 261 operating as the "Enterprise Data Dictionary" as discussed herein.

The processing of the intercepted SOAP messages are illustrated in the example of FIG. 6, explained below.

Figure 7:
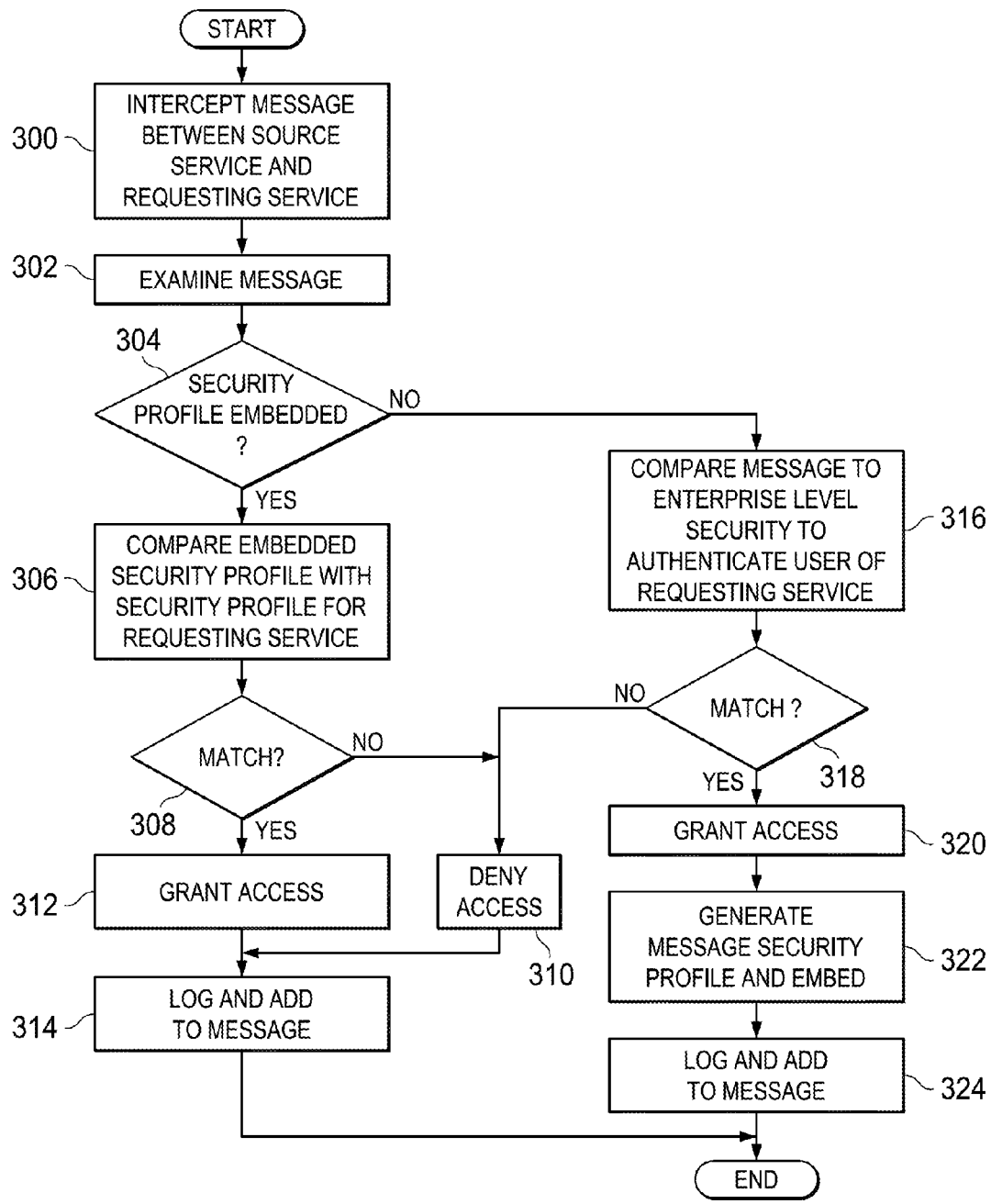
FIG. 7 shows a flowchart illustrating a method for securing a web services based architecture in an exemplary embodiment corresponding to the embodiment of FIG. 1 in which intermediaries are used.

Referring now to FIG. 7, a flowchart is shown for a method of securing a web services enabled application, in accordance with various embodiments of the present disclosure, in which intermediaries 106 are used. The method starts as a message is intercepted between an invoking web service 102 and a invoked web service 102 (block 300). The message may be intercepted by an intermediary 106, as discussed above, wherein the intermediary is associated with either the invoking or invoked web service. The intermediary that intercepts the message examines the message (block 302). Examining the message may occur at the XML level, which involves examining the message for XML-level threats without examining the actual contents of the message, or examining the message may occur at the data-level, delving into the contents of the message.

The intermediary that intercepted the message analyzes the message to determine whether a security profile is embedded in the message (block 304). If a security profile is embedded in the message, then the method proceeds to compare the embedded security profile with a security profile associated with the requesting service (block 306). The intermediary analyzes whether the comparison is a match (block 308), i.e., whether the data security designation, the user security designation, and the service security designation from the embedded profile in the message is the same as those designations of the requesting service. If the comparison is not a match, then the intermediary denies the requesting service access to the message (block 310).

If the comparison is a match, then the intermediary grants access for the requesting service to the message (block 312). The activities, including examining the message, performing the comparison, and granting access, are logged and added to the security profile embedded in the message such that an audit may be performed after the fact to determine who has had access to what and when (block 314).

Returning to block 304, if there is not a security profile embedded in the message (for example, when the message comprises an outbound, newly generated message that was generated at the source web service), the intermediary compares the message to an enterprise level security to authenticate the user associated with the requesting web service (block 316). If the user associated with the requesting web service cannot be authenticated at the enterprise level in a comparison at block 318, then the intermediary denies access for the requesting web service for the message (block 310). If the user associated with the requesting web service can be authenticated at the enterprise level in a comparison at block 318 (i.e., as being an approved user for the network), then the intermediary grants access for the requesting web service for the message (block 320). Additionally, the intermediary polls the owner of the data in the message to obtain information to generate a security profile (including a data security designation, a user security designation, and a service security designation), and generate a security profile for the message, which is embedded in the message (block 322). Finally, the activities, including examining the message, performing the comparison to authenticate the user at the enterprise level, and granting access, are logged and added to the newly generated security profile embedded in the message such that an audit may be performed after the fact to determine who has had access to what and when (block 314).

Embodiment in which the Web Services are hosted in a Cloud Environment.

Figure 8:
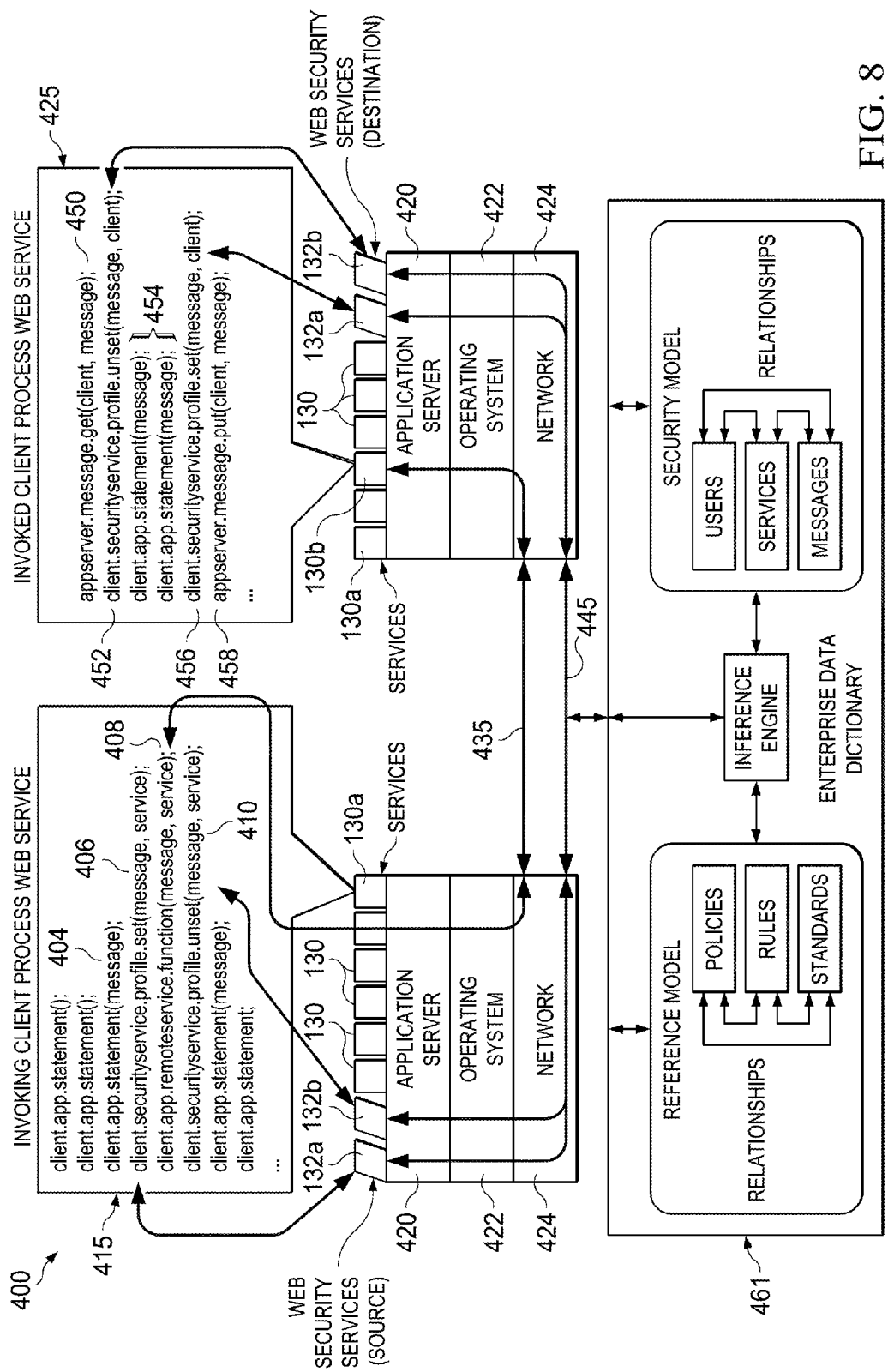
FIG. 8 illustrates the interaction of various software elements corresponding to the embodiment of FIG. 2 in which intermediaries are not used and instead the web services invoke web security services that perform the security functionality.

FIG. 2, discussed above, illustrates an embodiment in which at least some, if not all, of the client's web services are hosted in a cloud environment, that is, on a network 120 owned and controlled by a third party. FIG. 8 illustrates a software view 400 corresponding to web services 130 that are hosted on the third party network 120 of the embodiment of FIG. 2. Web services 130 are shown running on top of an application server 420 which, in turn, runs on top of an operating system 422. A network 424 enables the software stack 420 and 422 to exchange messages between web services 130. In the software view of FIG. 8, no intermediaries are used. Instead, one or more web security services 132 are shown and also run on top of the application servers 420.

In the example of FIG. 8, one web service 130a sends a SOAP message to another web service 130b. Web service 130a is an invoking service which invokes web service 130b (the invoked service). A portion of the functions performed by the invoking service 130a is illustrated at 415, while a portion of the functions performed by the invoked service 130b is illustrates at 425. At 404, the invoking service 130a generates a SOAP message to be sent to invoked service 130b. At 406, the invoking service 130a invokes the web security service 132 for the message generated at 404 and the target service to be invoked with that message. Whereas the web services of the embodiment of FIGS. 1 and 6 relied on the intermediaries 106 to intercept and process the security surrounding the messages, the embodiment of FIGS. 2 and 7 involves the web services themselves to invoke the appropriate security service 132.

The embodiment of FIGS. 2 and 8 show multiple security services 132. One security service 132a is invoked to determine whether an outgoing message targeted for a particular service 130 has a security profile sufficient to permit that message to be sent to that service. That security service can be invoked with a pseudo-code instruction: "client.securityservice.profile.set(message, service)" (406, 456). This security service queries its attached data dictionary instance for a reference model security profile that aligns with the message, user entity, and destination web service. If found, the intermediary 106 embeds the located security profile in the message and returns the message to the invoking service 130a. if not found, client.securityservice.profile.set( ) throws an exception for processing by the larger client application. The other security service 132b is used to process an incoming message by extracting the security profile from the incoming message. This security service can be invoked with a pseudo-code instruction: "client.securityservice.profile.unset(message, service)" (410, 452).

At 408, the invoking service 130a specifies the message and the web service 130b to be invoked using the specified message, which has been validated to be sent to the targeted service 130b. Arrow 435 illustrates that, from the point of view of the web services, invoking service 130a invokes services 130b and provides the specified SOAP message across the network 255 to the targeted invoked service 130b which then processes the message.

At 450, the invoked service 130b retrieves the SOAP message and, at 452, invokes the security service 132b to "unset" the SOAP message (client.securityservice.profile.unset). The unset function involves the security service 132b to extract the security profile from the SOAP message and compares it to the invoked service's profile within the security model resident in its attached data dictionary instance. If a match is found (user, data, service profiles), then the message, stripped of its security profile, is returned to the invoked service 130*b*. Once the message has been validated, the message is consumed and processed at 454. A reply message is generated and processed by the "set" security service 130*a* at 456 (client.securityservice. profile.set) which verifies that the reply message can, in fact, be sent to the service specified in the instruction (i.e., the invoking service 130*a*). Finally, at 458, the reply message is sent to the invoking service 130*a*. Arrow 445 signifies the flow of information between the security services 130 and intermediary 461 operating as the "Enterprise Data Dictionary" as discussed herein.

Method Embodiments of Security Service.

Figure 9:
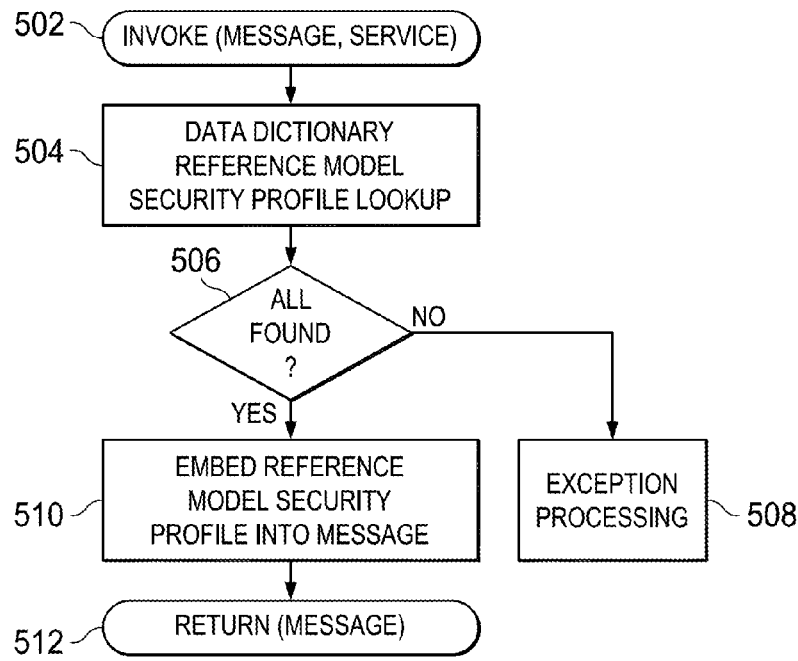
FIG. 9 shows a flowchart illustrating a method in which a security service, invoked by a web service, embeds a security profile in the message, one associated with the destination (invoked) web service, invoking user entity, and message.

FIG. 9 provides an illustrative embodiment of the functionality performed by the security services 130*a* that processes outgoing messages for proper security (client.securityservice.profile.set). At 502, the security service is invoked. At 504, the security service accesses the data dictionary to access the reference model security profile associated with the destination (invoked) web service, invoking user entity, and message. The constituent elements of the reference model security profile includes information about the user (i.e., the business entity that owns the process that encompasses the services being invoked), the data, and the invoked service. At 506, flow branches dependent on whether the reference model security profile sought at 504 was found. If found then the security service has determined, based on the existence of a proper reference model security profile, that the invoking service is permitted to send the particular data to the particular invoked service. If it is not found flow passes to 508 for exception processing. Exception processing may involve any one or more of the following: denying the message from being sent to the invoked service and terminate processing, logging the problem in a database but continue processing, suspend processing pending approval, etc.

Figure 10:
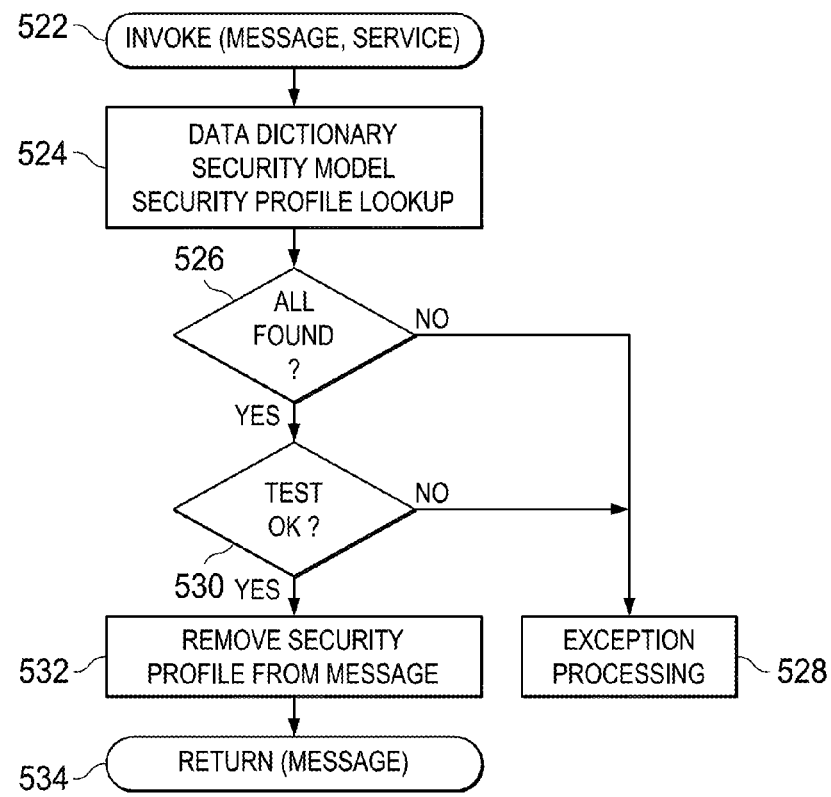
FIG. 10 shows a flowchart illustrating a method in which a security service, invoked by a web service, examines a security profile embedded in a message and removes a security profile from the message if the profile matches a reference model security profile.

FIG. 10 provides an illustrative embodiment of the functionality performed by the security services 130*b* that processes incoming messages for proper security (client.securityservice.profile.unset). The incoming messages have a security profile embedded in the message. At 522, the security service is invoked. At 524, the security service accesses the data dictionary to access the security model security profile associated with the corresponding web service. As explained above, the constituent elements of the reference model security profile includes information about the user (i.e., the business entity that owns the process that encompasses the services being invoked), the data, and the invoked service. At 526, if the security service found the three constituent elements of the reference model security profile in its access to the security model within its instance of the data dictionary, then the security service has determined that the invoking service may be permitted to send the particular data to the particular invoked service and that additional tests, block 530, are needed. if the reference model security profile or any of its elements were not found, control passes to 528 for exception processing. Exception processing may involve any one or more of the following: denying the message from being sent to the invoked service and terminate processing, logging the problem in a database but continue processing, suspend processing pending approval, etc.

With a successful test at block 526, flow continues to block 530 where the reference model entities and the security model entities are together assessed to determine if the invoked service is permitted to receive from the invoking service the message's data. This test utilizes object class information within the reference and security models, and the relationships between classes, to determine if this message transfer abides to security policy. If the testing fails at 530, then control passes to 528 for exception processing. If the testing passes at 530, then at 532 the security profile is removed from the message and the security service returns at 534.

Embodiment in which some Services are hosted on Client Network and other Services are hosted on Third Party Network.

FIG. 2 illustrates that some of the web services 122 are hosted on the client network 121, while other web services 130 are hosted on the third party hosting network 120. In accordance with some embodiments, the web services 122 hosted on the client network 121 use intermediaries 106 to intercept the incoming and outgoing messages and process them for security violations as explained above. Further, the third party hosting network 120 does not allow the use of intermediaries and imposes an application framework that must be followed by the client in the deployment of applications onto the third party hosting environment. Instead, the web services 130 hosted on the third party hosting network 120 invoke the security services 132 as explained above.

Figure 11:
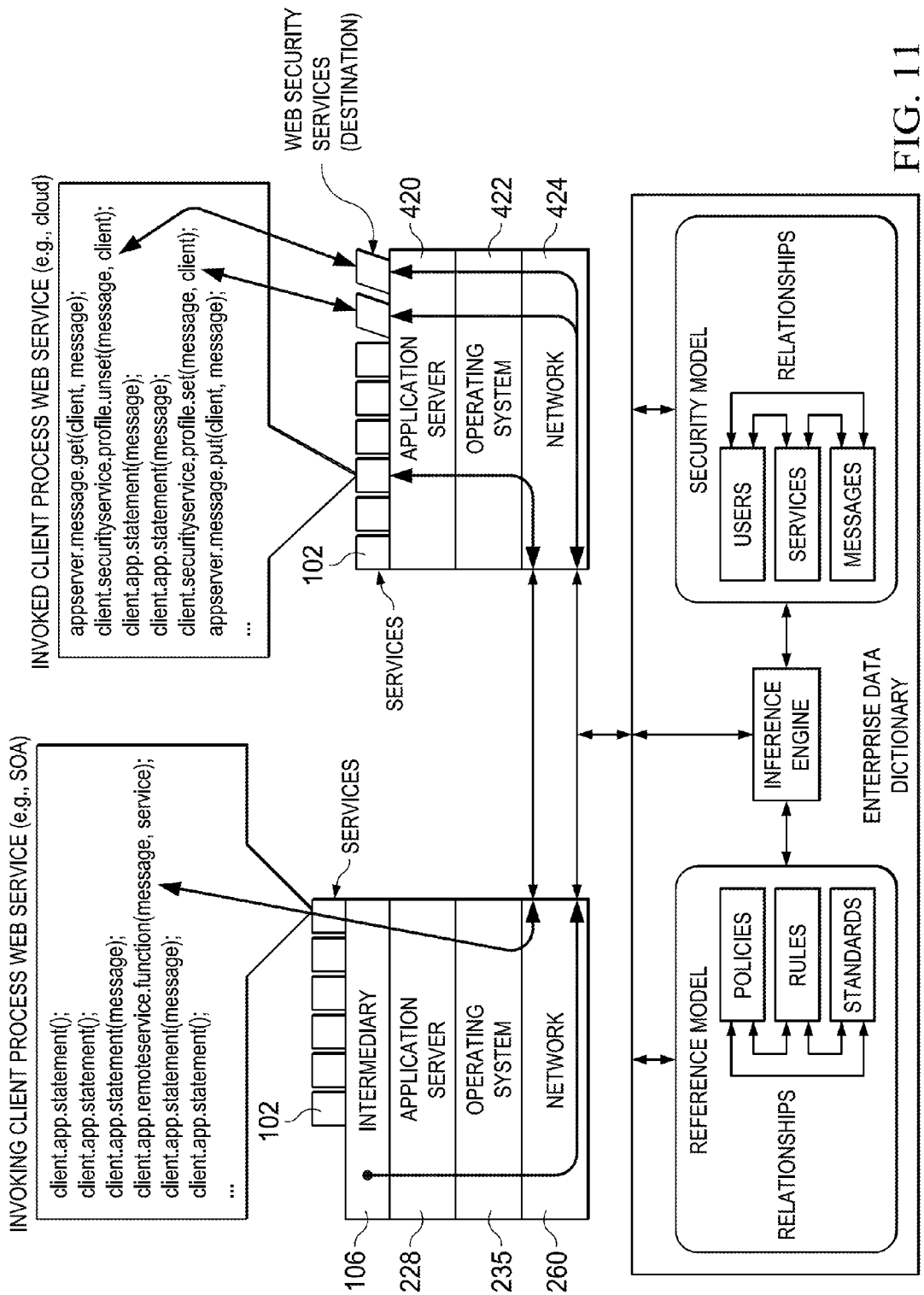
FIG. 11 illustrates the interaction of various software elements in a system in which some of the web services are hosted by a third party and other web services are hosted by the client.

FIG. 11 thus illustrates, on the left-hand side, web services 102 running on top of intermediaries 106 in a service oriented architecture (SOA) environment as explained with regard to FIG. 6. Also shown in FIG. 11, on the right-hand side, are web services 102 that run directly on the cloud hosted application server 420 without the use of intermediaries.

Illustrative Use Cases.

Figure 12:
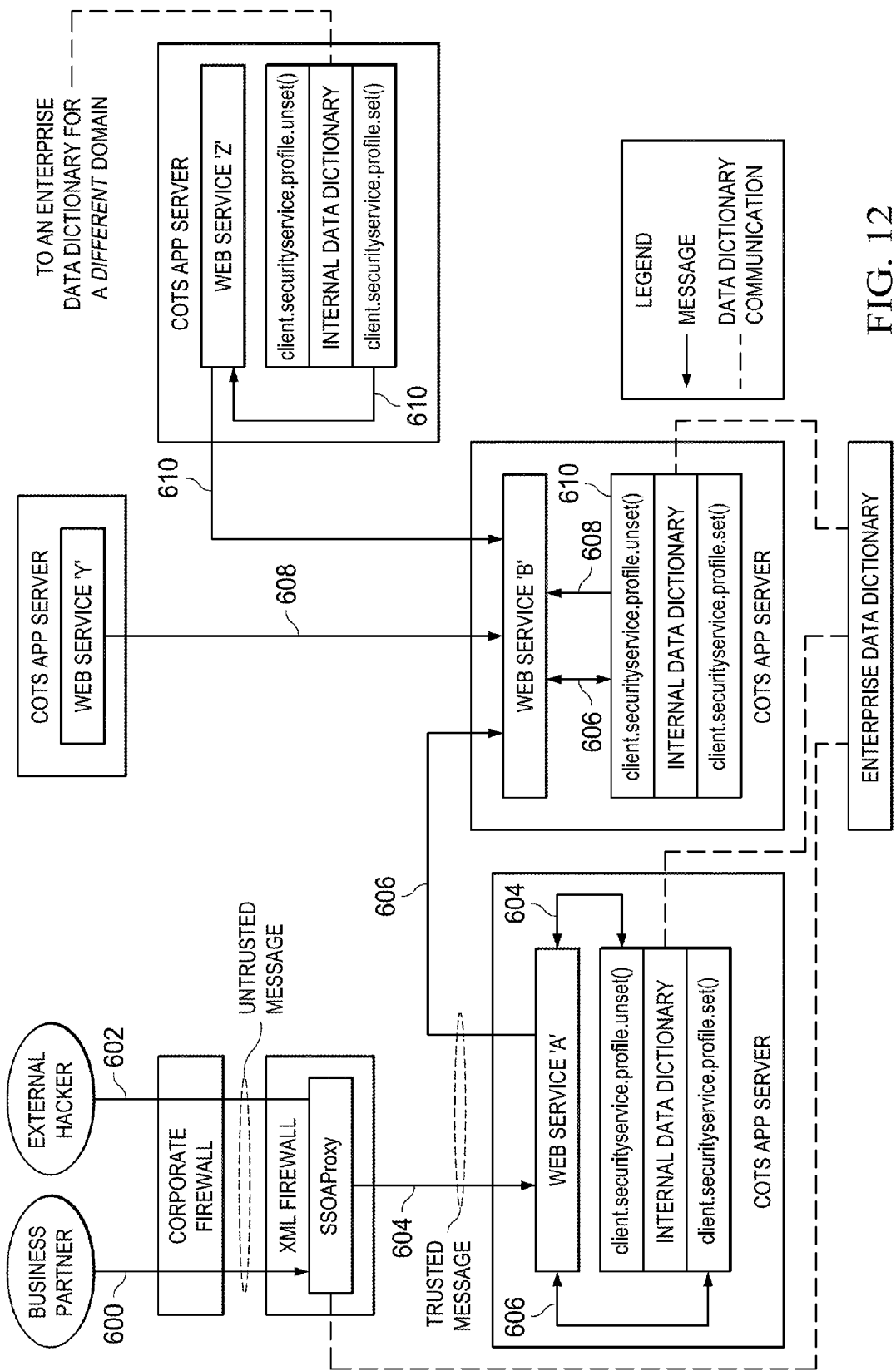
FIG. 12 shows a block diagram illustrating various illustrative use cases in accordance with the present disclosure.

This section provides a number of use case scenarios where security profiles are implemented per security policy and security requirements in a form that manifest themselves as automated security controls at the messaging level. The messaging level objects are found in the Data dictionary object class tree along with the other object classes imparted to each Data dictionary instance by the data and security architects, based on the enterprise security profile. FIG. 12 illustrates these use cases utilizing the security mechanisms explained above both for web services hosted on the client's own network as well as web services on a cloud computing environment.

Use case 600: A business partner sends an untrusted message across the corporate firewall to an SSOAProxy implemented within an industry standard XML firewall or proxy appliance. The message is assessed by the native capability of the XML firewall or proxy appliance for XML-level threats. SSOAProxy then proceeds to assess message validity by first inquiring with Enterprise Data Dictionary to retrieve the three-tuple data, service, and user security profile for the message, destination (invoked) service, and invoking user entity in the role currently in play. The user object instance of the security profile extracted from the Data dictionary object class tree (security model) provides the role instance for that user entity. The message is denied if the security profile is not consistent, i.e., the requested combination of user entity, data, and service is not recognized or not authorized as defined by security policy. Upon determining that the message is legitimate, SSOAProxy creates, signs, timestamps, and injects a SAML token, which encapsulates a corresponding reference model security profile, into the downstream message. SSOAProxy also performs logging and audit per message, approved or denied, as configured by policy and/or systems management.

Use case 602: An attacker attempts to send an unauthorized or malicious message across the firewall to SSOAProxy. As in scenario 1a, the message is assessed by the native capability of the XML firewall or proxy appliance to determine if it contains or invokes an XML-level attack. If one is detected, this event is logged and the message rejected, thwarting the attack. If the message is determined not to be a direct attack, SSOAProxy evaluated the message by first inquiring with the Enterprise Data Dictionary to retrieve the corresponding security model security profile. It then denies the request as the profile of the request on part of the attacker is not consistence with the security profile of the message. This event and its attributes are logged.

Use case 604: SSOAProxy routes the trusted message inbound to a Web Service residing on a COTS (Commercial Off The Shelf) application server located at a $3^{rd}$ party site, a site where the client (web application owner) does not own or control the infrastructure, including the COTS application server. The Web Service 'A', part of the client's web application, receives the message and immediately passes it to the web security service, client.securityservice.profile.unset( ). This service contains only the functionality needed to validate (assert) that the injected security profile embedded within the SAML token, in comparison to its internally stored data dictionary security model instance, abides to security policy for the invoked service. Any one data dictionary instance is populated with an object class tree specific to the user, message, and data profiles within its visibility, as determined by the enterprise security profile managed by the Enterprise Data Dictionary. If the assertion is successfully validated the message is striped of its security profile and returned to the invoking service. Otherwise client.securityservice.profile.unset( ) throws an exception for processing by the larger client application. client.securityservice.profile.unset( ) also performs logging and audit per message as configured by policy and/or systems management.

Use case 606: Since this is a federated transaction, the Web Service 'A' then forwards the message outbound to Web Service B', also at the $3^{rd}$ party site. It first forwards the message to the web security service, client.securityservice.profile.set( ) to package the message with a SAML token containing the reference model security profile for that user/message/destination service combination extracted from the internally stored Data Dictionary instance. Optionally, client.securityservice.profile.set( ) can revalidate the security profile of the invoking user entity for this message against the security profile of the destination service. If this three-tuple is not consistent, an exception can be thrown. This revalidation is optional as the same checks are made at the receiving end of the message (the destination service). client.securityservice.profile.set( ) also performs logging and audit per message as configured by policy and/or systems management. With the security profile added to the message, the message is returned to the invoking service, which then sends the message to the destination service.

Use case 606 continues with the arrival of the trusted message at the destination service, Web Service B'. Web Service 'B', part of the client's web application, receives the message and immediately passes it to the web security service, client.securityservice.profile.unset( ) This service contains only the functionality needed to validate (assert) that the injected security profile embedded within the SAML token, in comparison to its internally stored data dictionary security model instance, abides to security policy for the invoked service. If the assertion is successfully validated the message is striped of its security profile and returned to the invoking service. Otherwise client.securityservice.profile.unset( ) throws an exception for processing by the larger client application. client.securityservice.profile.unset( ) also performs logging and audit per message as configured by policy and/or systems management.

Use case 608: A rogue Web Service 'Y' attempts to deliver a message to Web Service B'. Web Service B' receives the message and immediately passes it to the web security service, client.securityservice.profile.unset( ). The attempt to validate (assert) the injected security profile embedded within the SAML token within the message fails immediately as no security profile is present. client.securityservice.profile.unset( ) throws an exception for processing by the larger client application, most likely to drop the message—it is 'noise' on the bus. client.securityservice.profile.unset( ) also performs logging and audit per message as configured by policy and/or systems management.

Use case 610: A Web Service 'Z', a web service associated with a different security domain, for a different web application, attempts to deliver a message to Web Service 'B'. As Web Service 'Z' is security services enabled, it first forwards the message to the web security service, client.securityservice.profile.set( ) to package the message with a SAML token containing the reference model security profile for that user/message/destination service combination extracted from the internally stored Data dictionary instance configured to its visibility, visibility within the different security domain. Web Service 'Z's client.securityservice.profile.set( ) will fail to embed a security profile for the destination service as Web Service 'B' is not within the visibility of its internal data dictionary—it is in the wrong domain. client.securityservice.profile.set( ) throws an exception for processing by the larger client application, most likely to drop the message. client.securityservice.profile.set( ) also performs logging and audit per message as configured by policy and/or systems management.

To illustrate the robustness of this model driven security architecture, let's continue with use case 610 with the security profile added to the Web Service 'Z's message, for reasons unknown. The message is returned to the invoking service 'Z', which then sends the message to the destination service. Web Service B' receives the message and immediately passes it to its web security service, client.securityservice.profile.unset( ). The attempt to validate (assert) the injected security profile embedded within the SAML token within the message fails immediately as the security profile of the message is not with the internally stored data dictionary security model instance within its visibility. The received message is not within this web application's security domain. Visibility into the different security domain was not provided in the security policy configured within the Enterprise Data Dictionary. This message is not authorized. client.securityservice.profile.unset( ) throws an exception for processing by the larger client application, most likely to drop the message. client.securityservice.profile.unset( ) also performs logging and audit per message as configured by policy and/or systems management.

Note that if visibility into the different security domain had been provided in the security policy configured within the Enterprise Data Dictionary, and the security policy authorized Web Service 'Z' to invoke Web Service 'B', then the received message security profile would have been within client.securityservice.profile.unset( )'s visibility. The test to validate (assert) the message security profile in comparison to B's internally stored data dictionary security model instance would have been successful as the internal data dictionary instance would be populated with an object class tree specific to the user, message, and data profiles for Web Service 'Z'.

What is claimed is:

1. A non-transitory storage device containing software that, when executed by a processor, causes the processor to:
   implement a data dictionary that implements an instance of a hierarchical class tree that includes a plurality of class and data objects;
   receive a portion of a hierarchical class tree comprising client segments from an external system hosting a peer data dictionary instance, said received portion includes class definitions and security profile information that specifies restrictions on use of data objects identified by the received portion and wherein the machine instructions preclude the processor from accessing the data objects without the use of the web security service and without the received hierarchical class tree portion;
   attach the received portion to the instance of the hierarchical class tree;
   receive an access request from a web service for a data object identified by the received portion;
   validate the access request form the web service using the security profile information associated with the requested data object and by performing at least three verifications: a first verification to determine whether the web service is authorized to send the access request, a second verification to determine whether the data object requested is permitted to be requested by the web service, and a third verification to determine whether a web service intended to receive the access request is authorized to receive the access request; and
   transmit the access request based on successful completion of the first, second, and third verifications.

2. The non-transitory storage device of claim 1 wherein: the hierarchical class tree includes system segments and client segments and the system segments comprise system-based security policy metadata objects and system-based enterprise business metadata objects; and
   the client segments comprise client-based security policy metadata objects, client-based enterprise business metadata objects, client-based security policy data objects, and the client-based enterprise business data object, the client-based security policy data objects integrated with the client-based enterprise business data object located at a terminal node of the hierarchical class tree.

3. The non-transitory storage device of claim 1 wherein the software, when executed, causes the processor to attach the received portion at a boundary node that is replaced with an identity node that identifies ownership of the received portion.

4. The non-transitory storage device of claim 1 wherein the hierarchical class tree comprises a plurality of nodes, some nodes being child nodes connected to parent nodes and the software, when executed, causes the processor to cause each child node to inherit the security policies of its parent node.

5. A non-transitory storage device containing software that, when executed by a processor, causes the processor to:
   implement a data dictionary that implements an instance of a hierarchical class tree that includes a plurality of class and data objects;
   receive a request for a targeted portion of the hierarchical class tree, the targeted portion includes an identity node that identifies the ownership of the targeted portion and class definitions and security profile information that specifies restrictions on use of data objects identified by the targeted portion;
   transmit the targeted portion of the hierarchical class tree;
   validate an incoming message from a web service requesting access to a data object to permit a web service to access the data object, the data object not being accessible unless the message is validated and the hierarchical class tree is used, the validation including at least three verifications including a first verification to determine whether the web service is authorized to receive the incoming message, a second verification to determine whether any data targeted by the message is permitted to be accessed by the web service, and a third verification to determine whether an entity that provided the message was permitted to provide the message; and
   upon all of the verifications being successfully performed, receive a response message and validate the response message, before it is transmitted, by performing at least three verifications including a fourth verification to determine whether the web service is authorized to transmit the response message, a fifth verification to determine whether any data included in the response message is permitted to be accessed by the web service, and a sixth verification to determine whether the entity is permitted to receive the response message; and
   transmit the response message to the entity based on successfully performing each of the fourth, fifth, and sixth verifications.

6. The non-transitory storage device of claim 5 wherein the hierarchical class tree includes system segments and client segments:
   wherein the system segments comprise system-based security policy metadata objects and system-based enterprise business metadata objects; and
   wherein the client segments comprise client-based security policy metadata objects, client-based enterprise business metadata objects, client-based security policy data objects, and the client-based enterprise business data object, the client-based security policy data objects integrated with the client-based enterprise business data object located at a terminal node of the hierarchical class tree.

7. The non-transitory storage device of claim 5 wherein the hierarchical class tree comprises a plurality of nodes, some nodes being child nodes connected to parent nodes and, the software, when executed, causes the processor to cause each child node to inherit the security policies of its parent node.

* * * * *